(12) United States Patent
Chung et al.

(10) Patent No.: US 7,172,394 B2
(45) Date of Patent: Feb. 6, 2007

(54) SADDLE BEARING LINER FOR AXIAL PISTON PUMP

(75) Inventors: Robert D. Chung, Greenfiled, WI (US); Anthony M. Claas, Waukesha, WI (US); Reginald J. Goss, Thiensville, WI (US); Mark J. Matenaer, West Bend, WI (US)

(73) Assignee: The Oilgear Company, Milwaukee, WI (US)

( * ) Notice: Subject to any disclaimer, the term of this patent is extended or adjusted under 35 U.S.C. 154(b) by 186 days.

(21) Appl. No.: 10/473,990

(22) PCT Filed: Mar. 28, 2002

(86) PCT No.: PCT/US02/09556

§ 371 (c)(1),
(2), (4) Date: May 17, 2004

(87) PCT Pub. No.: WO02/081910

PCT Pub. Date: Oct. 17, 2002

(65) Prior Publication Data

US 2004/0206231 A1    Oct. 21, 2004

Related U.S. Application Data

(60) Provisional application No. 60/281,913, filed on Apr. 5, 2001.

(51) Int. Cl.
*F04B 1/26* (2006.01)
(52) U.S. Cl. .................. 417/449; 417/222.1
(58) Field of Classification Search ........... 417/222.1, 417/222.2; 92/12.2, 71, 1
See application file for complete search history.

(56) References Cited

U.S. PATENT DOCUMENTS

| 3,747,476 A | 7/1973 | Ankeny et al. ............... 91/489 |
| 4,627,330 A | 12/1986 | Beck, Jr. .................... 92/12.2 |
| 4,903,577 A | 2/1990 | Loffler ......................... 91/488 |
| 5,709,141 A | 1/1998 | Ohashi et al. ............... 92/12.2 |
| 6,027,250 A | 2/2000 | Reubelt et al. ................ 382/2 |
| 2002/0136475 A1* | 9/2002 | Harimoto et al. ........... 384/451 |

OTHER PUBLICATIONS

International Search Report, Form PCT/ISA/210, as issued by European Patent Office in Connection with PCT Application No. PCT/US02/09556.
Written Opinion, Form PCT/IPEA/408, as issued by United States Patent and Trademark Office in Connection with PCT Application No. PCT/US02/09556.

* cited by examiner

*Primary Examiner*—Anthony D. Stashick
*Assistant Examiner*—Samuel E. Belt
(74) *Attorney, Agent, or Firm*—Quarles & Brady LLP

(57) ABSTRACT

A saddle bearing liner (30) for a variable displacement axial piston pump (10) includes two axially-spaced apart bearing surfaces (62, 64) with an offset central section (54) integrally joining them. A hollow projection (80) extends radially from the convex side of the pressure bearing section (50) and is received with a recess (82) of the housing (12) to locate the liner (30). The liner (30) has radially extending ledges (70, 72) which mate with surfaces (74, 76) of the housing (12) to inhibit skewing of the bearing liner (30) relative to the axis of the bearing surfaces (62, 64). The projection (80) is hollow and opens to the bearing surface (62) so that pressurized fluid from the housing (12) can be injected between the bearing surface (62) and the mating surface (22) of the swashblock (20). The projection (80) also prevents the liner (30) from rotating about the bearing surface axis.

10 Claims, 5 Drawing Sheets

SADDLE BEARING LINER FOR AXIAL PISTON PUMP

CROSS-REFERENCE TO RELATED APPLICATION

This claims the benefit of U.S. Provisional Patent Application No. 60/281,913 filed Apr. 5, 2001.

STATEMENT CONCERNING FEDERALLY SPONSORED RESEARCH OR DEVELOPMENT

Not applicable.

FIELD OF THE INVENTION

The field of the invention is variable flow axial piston pumps, and in particular, saddle bearings, sometimes referred to as cradle bearings, for such pumps.

DISCUSSION OF THE PRIOR ART

Variable flow axial piston pumps are well-known from patents such as U.S. Pat. Nos. 3,868,889; 4,710,107; 4,581,980; 4,896,583; and 5,630,352. As shown in the '583 patent, there are typically two liner-type sliding bearings between the concave surfaces of the saddle or cradle and the convex surfaces of the swashblock. These two bearing liners are typically pinned or otherwise affixed to either the swashblock or to the saddle. In addition, the bearings are guided by one or more surfaces which confront the longitudinal edges of each bearing section.

Typical prior art constructions have therefore included a number of parts to assemble a bearing liner to the swashblock or saddle, and also have required significant machining of the structures confronting the sides of the bearing liners. It is an object of the present invention to address these issues.

SUMMARY OF THE INVENTION

The invention provides a saddle bearing liner in which two spaced apart saddle bearing liner sliding surfaces are provided which are arcuate and have an outer surface adapted to mate with an arcuate cradle surface of the saddle and have an inner surface adapted to mate with an arcuate surface of the swashblock. The two saddle bearing liner sections are bridged by a central section which is integral with the saddle bearing liner sections. Thereby, both saddle bearing liner surfaces are provided in a single piece.

In a preferred aspect, the central section of a liner of the invention has at least one surface which is offset from the adjacent surfaces of the bearing sections. The central section, therefore, mates with the saddle or swashblock to guide the saddle bearing liner so as to prevent it from rocking or becoming skewed excessively between the saddle and swashblock surfaces.

In another useful aspect, a liner of the invention has a projection which fits into a recess of the saddle to locate the liner and prevent it from turning about its longitudinal axis. The projection, preferably, extends into a recess of the saddle so that the liner is stationary relative to the saddle with the sliding surfaces of the liner being against the swashblock. This makes pinning the liner to the saddle or to the swashblock unnecessary.

In another preferred aspect, the projection can be hollow, defining a passageway which opens to at least one of the sliding surfaces of the liner. The passageway and the projection at its end opposite from the sliding surface is in communication with pressurized fluid provided by suitable passageways in the saddle. Preferably, the sliding surface which the passageway opens to is on the pressure side of the liner, meaning that it is axially opposite from the pistons of the pump which are compressing the fluid. Thus, a pressurized film of fluid is maintained between the sliding surfaces of the bearing liner on at least that side of the liner to reduce friction between the liner and the swashblock.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
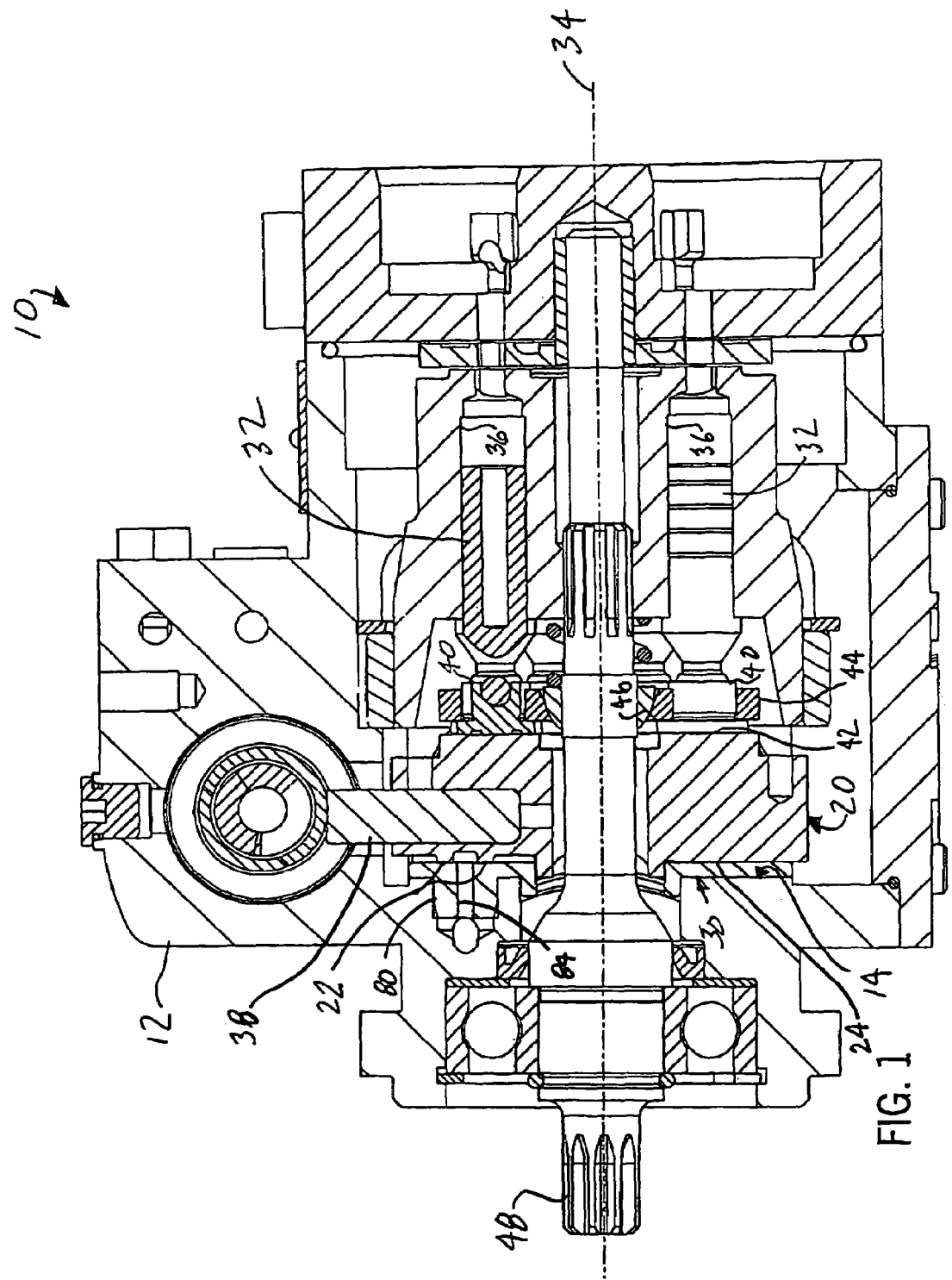
FIG. 1 is a cross-sectional view of an axial piston pump incorporating a saddle bearing liner of the invention.
Figure 2:
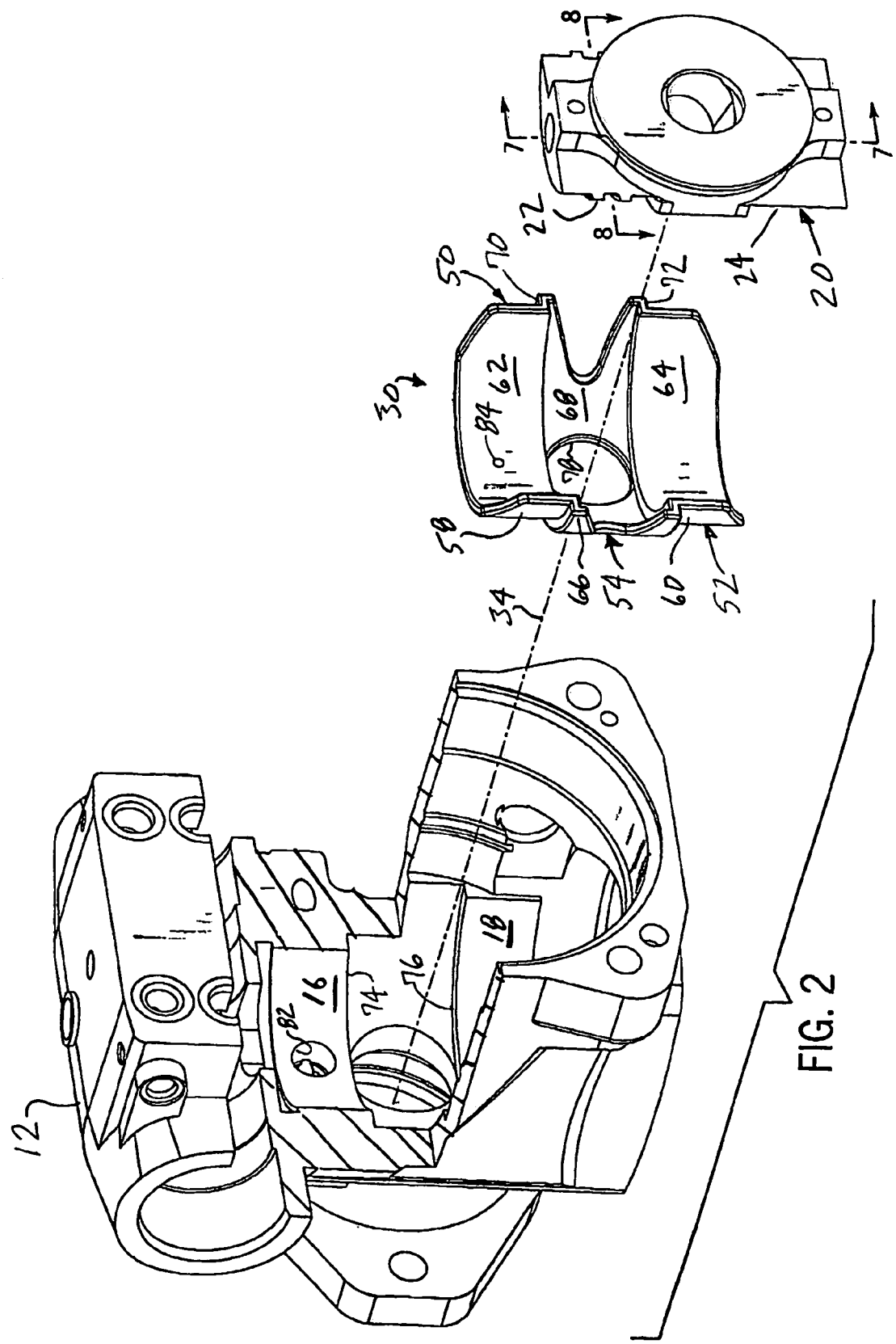
FIG. 2 is an exploded perspective view of the pump housing, liner, and swashblock, with portions of the housing broken away to show the saddle.
Figure 3:
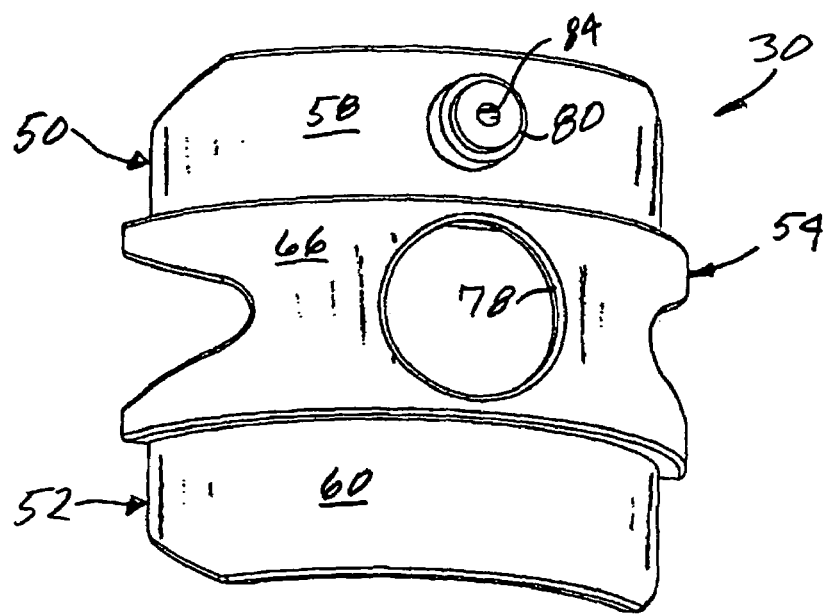
FIG. 3 is a perspective view of the liner from the outer or saddle side thereof.
Figure 4:
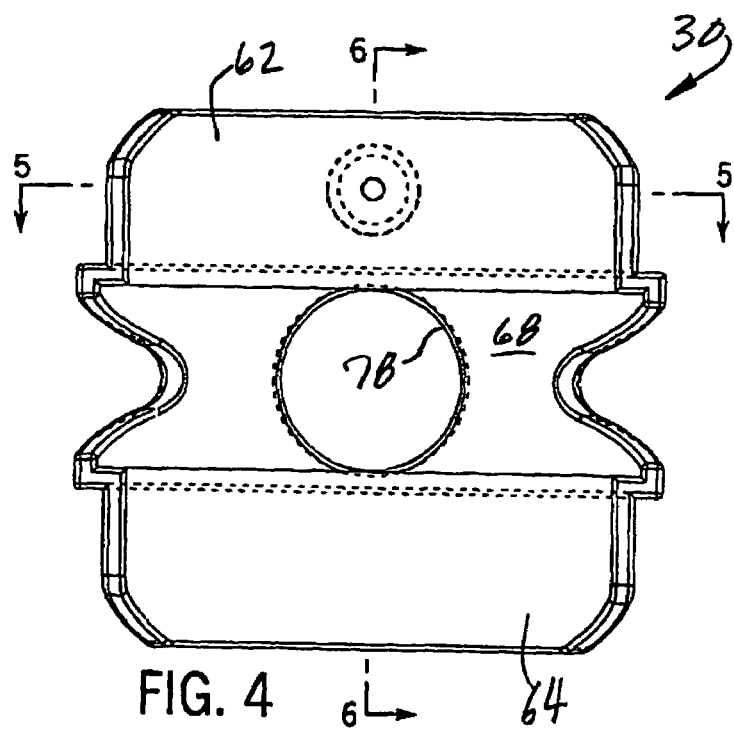
FIG. 4 is a plan view of the liner from the inner or swashblock side thereof.
Figure 5:
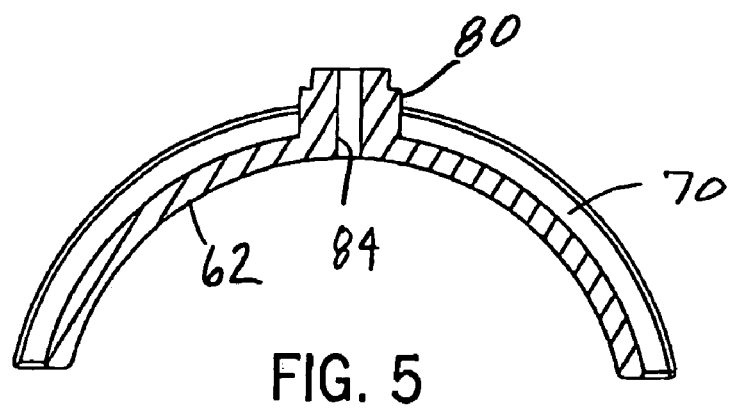
FIG. 5 is a cross-sectional view from the plane of the line 5—5 of FIG. 4.
Figure 6:
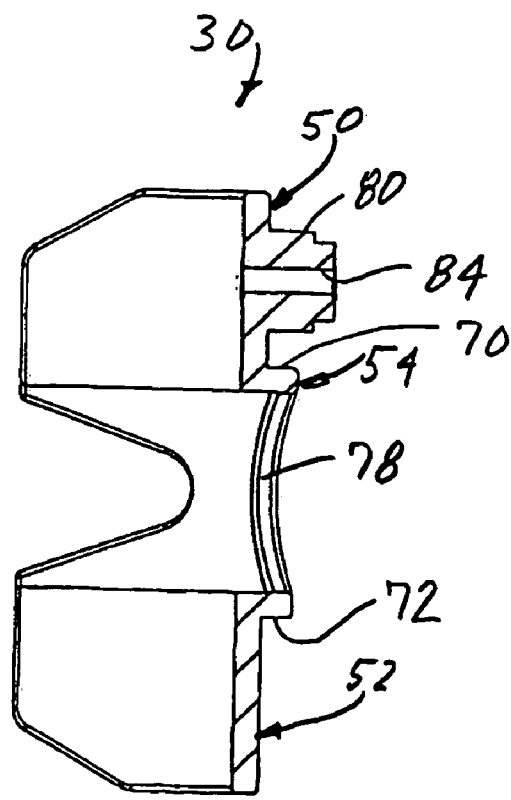
FIG. 6 is a cross-sectional view from the plane of the line 6—6 of FIG. 4.

Referring to FIG. 1, a variable displacement axial piston pump 10 has a housing 12 which defines a saddle or cradle 14 that includes two axially spaced apart convex surfaces 16 and 18 (FIG. 2). The pump 10 also includes a swashblock 20 which has convex surfaces 22 and 24 that are shaped to conform to the surfaces 16 and 18 with a saddle bearing liner 30 of the invention between the concave 16, 18 and convex 22, 24 surfaces. The pump 10 also has a number of pistons 32 which are radially disposed about pump axis 34 to reciprocate in cylinders 36 when the swashblock 20 is moved off of its center or balanced position by shuttling control pin 38 to one side or the other, either manually or using a hydraulically operated piston or other device. As is well-known, the pistons 32 have shoes 40 which slide against a flat face 42 of the swashblock 20 and a shoe retainer 44 which maintains the shoes in position relative to one another and relative to a fulcrum ball 46. A shaft 48 which is journaled in the housing turns the piston and cylinder assembly, also as is well-known.

Referring to FIGS. 2–6, the liner 30 has two bearing sections 50 and 52 which are axially spaced apart relative to the turning axis of the swashblock, which is the same axis as the turning axis of the liner 30, the axis of the concave saddle surfaces 16 and 18 and the axis of the convex bearing surfaces 22, 24. A central section 54 of the liner 30 is between the bearing sections 50 and 52 and is integral therewith. The liner 30 can be a polymeric material.

Each of the bearing sections 50 and 52 has an outer convex surface 58, 60 which mates with the respective surface 16 or 18 and an inner concave surface 62, 64 mates with the respective convex surface 22, 24 of the swashblock 20. The central section 54 also has an outer convex surface 66 and an inner concave surface 68, with the outer surface 66 being radially offset from the outer surfaces 58 and 60, and the inner surface 68 also being offset from the inner surfaces 62, 64. This offsetting creates radially extending ledges 70 and 72 on the outer surface of the liner 30, which surfaces face shoulder surfaces 74 and 76 which are undercut into the housing 12. Since the surfaces 70, 72, 74, and 76 extend in planes which are perpendicular to the turning axis of the liner 30, the fit of these surfaces with one another keeps the liner 30 from becoming skewed, also referred to as rocking, between the saddle surface 16 and 18 and the swashblock 20. The central section 54 also has a hole 78 through it through which the shaft 48 extends.

Referring particularly to FIGS. 3–6, a projection 80 extends radially from surface 58 of bearing section 50 and is received in recess 82 in the saddle surface 16. The projection 80 is hollow, defining a lumen 84 which opens to the sliding bearing surface 62 on the inside of the liner 30. The capturing of the projection 80 in the recess 82 fixes the liner 30 from rotating relative to the housing 12, so all of the sliding occurs between the liner 30 and the swashblock 20. Thus, surfaces 62 and 64 are sliding bearing surfaces and surfaces 58 and 60 are stationary support surfaces.

Figure 7:
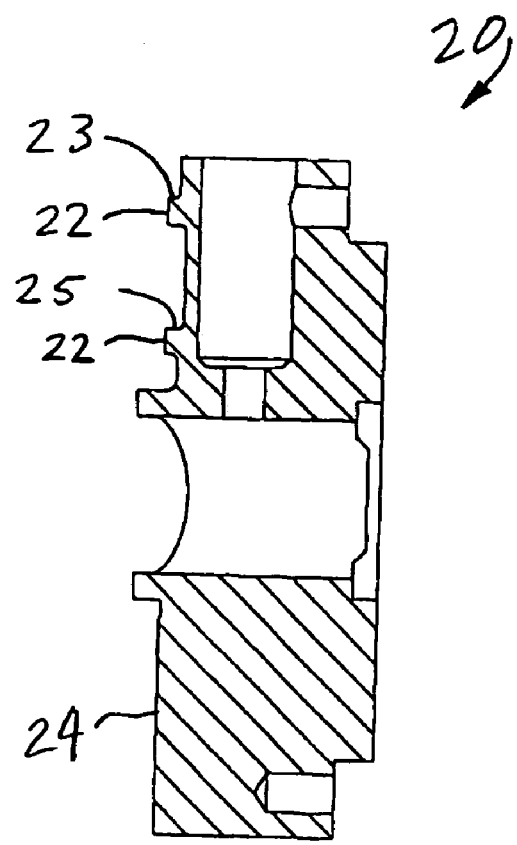
FIG. 7 is a longitudinal cross-sectional view of the swashblock from the plane of the line 7—7 of FIG. 2.
Figure 8:
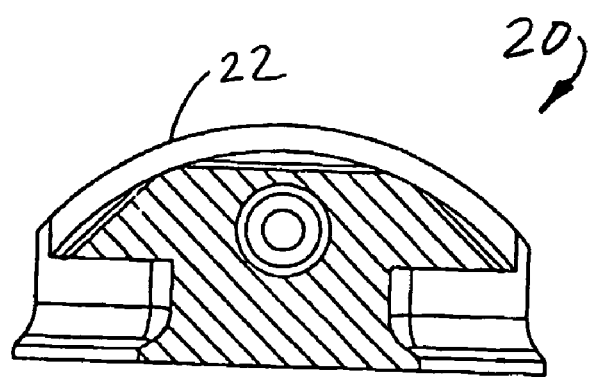
FIG. 8 is a radial cross-sectional view of the swashblock from the plane of the line 8—8 of FIG. 2.

Referring to FIG. 1, hydraulic fluid under pressure is introduced to the recess 82 by appropriate passageways in the housing 12 so that the fluid under pressure is injected between the surface 62 and the swashblock 20. Referring to FIG. 1 and FIG. 7, the fluid is introduced to an undercut area of the swashblock 20 between two ridges 23, 25 on which the concave surface 22 is defined. Thus, a steady supply of oil under pressure is maintained to provide a film of oil between the surfaces 22 and the surface 16. The surface 16 and the surfaces 22 are preferably opposite from the outlet of the pump (the compression side of the pump) so that they are the pressure bearing surfaces, meaning that they react against the positive pressure which is generated by the pistons 32 pumping and the cylinders 36, which pushes the surfaces 22 toward the surface 62. On the lower half of the liner, at surface 64, the pistons in this area are drawing a relative vacuum to draw fluid into the cylinders 36 so the forces compressing the surfaces 22 against surface 62 are much reduced.

A preferred embodiment of the invention has been described in considerable detail. Many modifications and variations will be apparent to those skilled in the art. Therefore, the invention should not be limited to the embodiment described, but should be defined by the claims which follow.

We claim:

1. In a variable displacement axial piston pump having a swashblock with a pair of axially spaced apart convex surfaces and a saddle with a mating pair of axially spaced apart concave surfaces to receive the swashblock convex surfaces with bearing material between said mating concave and convex surfaces, the improvement wherein the bearing material between one pair of mating concave and convex surfaces is integral with the bearing material between the other pair of mating concave and convex surfaces, a central section of the same material as said bearing material joins and is integral with the bearing material which is in between said two pairs of mating concave and convex surfaces, at least one of the inner and outer surfaces of the central section is radially offset from the adjacent surfaces of the bearing material which is between said two pairs of mating concave and convex surfaces, said offset surface is on the outer side of said bearing material and fits within a recess of said saddle and at least one ledge is defined between said offset surface and an adjacent surface of said bearing material, said ledge mating with a surface of said saddle to resist skewing of said bearing material relative to an axis of said concave surfaces of said saddle.

2. The improvement of claim 1, wherein two said ledges are defined, one on each side of said central section of said bearing material.

3. The improvement of claim 1, wherein at least one surface of said bearing material includes a projection which projects radially from said surface.

4. The improvement of claim 3, wherein said projection projects from a convex surface of said bearing material.

5. The improvement of claim 4, wherein said projection projects from said convex surface opposite from a concave sliding surface of said bearing material.

6. In a variable displacement axial piston pump having a swashblock with a pair of axially spaced apart convex surfaces and a saddle with a mating pair of axially spaced apart concave surfaces to receive the swashblock convex surfaces with bearing material between said mating concave and convex surfaces, the improvement wherein the bearing material between one pair of mating concave and convex surfaces is integral with the bearing material between the other pair of mating concave and convex surfaces, at least one surface of said bearing material includes a hollow projection which projects radially from a convex surface of said bearing material opposite from a concave sliding surface of said bearing material that reacts against positive pressures generated by said pump.

7. The improvement of claim 6, wherein said projection opens to said sliding reaction surface.

8. In a variable displacement axial piston pump having a swashblock with a pair of axially spaced apart convex surfaces and a saddle with a mating pair of axially spaced apart concave surfaces to receive the swashblock convex surfaces with bearing material between said mating concave and convex surfaces, the improvement wherein the bearing material between one pair of mating concave and convex surfaces is integral with the bearing material between the other pair of mating concave and convex surfaces, at least one surface of said bearing material includes a hollow projection which projects radially from a surface of said bearing material and opens to a sliding surface of said bearing material.

9. In a variable displacement axial piston pump having a swashblock with a pair of axially spaced apart convex surfaces and a saddle with a mating pair of axially spaced apart concave surfaces to receive the swashblock convex surfaces with bearing material between said mating concave and convex surfaces, the improvement wherein the bearing material between one pair of mating concave and convex surfaces is integral with the bearing material between the other pair of mating concave and convex surfaces, at least one surface of said bearing material includes a projection which projects radially from said surface and said projection is received within a recess of said saddle thereby fixing the bearing material from rotating relative to the saddle.

10. The improvement of claim 9, wherein said recess is in communication with pressurized hydraulic fluid and said projection is hollow and opens to a bearing surface of said bearing material.

* * * * *